(12) United States Patent
Klaasen et al.

(10) Patent No.: US 8,053,519 B2
(45) Date of Patent: Nov. 8, 2011

(54) COATING COMPOSITION COMPRISING A VINYL MODIFIED ALKYD RESIN

(75) Inventors: Robert Paul Klaasen, Amsterdam (NL); Adrianus Jozefus Hendricus Lansbergen, Oosterbeek (NL); Dick Christiaan Smit, Leiden (NL)

(73) Assignee: Akzo Nobel Coatings International B.V., Arnhem (NL)

( * ) Notice: Subject to any disclaimer, the term of this patent is extended or adjusted under 35 U.S.C. 154(b) by 143 days.

(21) Appl. No.: 11/597,439

(22) PCT Filed: May 24, 2005

(86) PCT No.: PCT/EP2005/052370
§ 371 (c)(1), (2), (4) Date: Jul. 27, 2007

(87) PCT Pub. No.: WO2005/116154
PCT Pub. Date: Dec. 8, 2005

(65) Prior Publication Data
US 2008/0108762 A1   May 8, 2008

(30) Foreign Application Priority Data
May 25, 2004 (EP) ..................................... 04076514

(51) Int. Cl.
*C08G 63/91* (2006.01)

(52) U.S. Cl. ........ 525/48; 427/412.5; 525/32.2; 525/43; 525/49; 525/330.3; 525/333.3; 525/450; 526/213

(58) Field of Classification Search ..................... 525/64, 525/539, 451; 428/480; 427/412.5
See application file for complete search history.

(56) References Cited

U.S. PATENT DOCUMENTS

| | | | | |
|---|---|---|---|---|
| 3,634,351 | A | * | 1/1972 | Kimura et al. ..................... 525/7 |
| 3,743,615 | A | * | 7/1973 | Yethou et al. ..................... 525/7 |
| 4,927,877 | A | | 5/1990 | Shibata et al. |
| 5,102,925 | A | * | 4/1992 | Suzuki et al. ................. 523/500 |
| 5,959,067 | A | * | 9/1999 | Bakker et al. ............. 528/295.3 |
| 7,045,574 | B1 | * | 5/2006 | Funakoshi et al. .............. 525/64 |

FOREIGN PATENT DOCUMENTS

| | | | |
|---|---|---|---|
| EP | 0 383 273 A1 | | 8/1990 |
| GB | 1 280 535 | | 7/1972 |
| WO | 00/73361 | * | 12/2000 |
| WO | 03/044110 | * | 5/2003 |

OTHER PUBLICATIONS

Clive J. Coady, "Alkyd Resins Using IPA Improve High-Solids Coatings," Modern Paint and Coatings, pp. 40-45, Feb. 1992.
Patent Abstract of Japan, 62054767-A, Mar. 6, 1985.
H. Burrell, "Solubility Parameter Values," *Polymer Handbook of Brandrup en Immergut*, $2^{nd}$ Ed., 1975.
Majumdar S et al., Acrylate Grafted Dehydrated Castor Oil Alkyd—A Binder for Exterior Paints, JCT. Journal of Coatings Technology, Philadelphia, Pa, US, vol. 70, No. 879, Apr. 1998, pp. 27-33.
International Search Report and Written Opinion, PCT International Application No. PCT/EP2005/052370, dated Aug. 22, 2005.

* cited by examiner

*Primary Examiner* — Vasu Jagannathan
*Assistant Examiner* — Robert C Boyle
(74) *Attorney, Agent, or Firm* — Kenyon & Kenyon LLP

(57) ABSTRACT

Coating composition comprising an alkyd having at least 20% by weight of vinylic building blocks and having an oil length below 65%. The weight ratio non-vinylic:vinylic groups is between 1:1 and 4:1, preferably between 1.5:1 and 3:1. The vinylic groups include styrene and (meth)acrylate groups. The ratio of styrene:(meth)acrylate groups is between 0.5:1 and 4:1, preferably between 1.5:1 and 3:1. The vinylic groups show low polarity. The Mw is below 10,000. The oil length is above 45%. The coating composition can be water borne or solvent borne. The alkyd according to the invention allows formulation of solvent borne coatings a volatile organic content below 300 g/l.

5 Claims, No Drawings

COATING COMPOSITION COMPRISING A VINYL MODIFIED ALKYD RESIN

This is a national stage entry of PCT/EP05/52370 and claims benefit to EP 04076514.1.

The invention relates to a solvent-borne coating composition comprising an alkyd which is modified by vinylic grafting, e.g., with styrene or (meth)acrylic groups.

Alkyd resins are poly-condensation products made of one or more polyols and one or more polycarboxylic acids and one or more monocarboxylic acids as a chain stopper. To render the alkyd oxidatively drying, olefinically unsaturated fatty acids are used.

Alkyds are often characterized by their oil length. Oil length is defined as the weight percentage of fatty acid building blocks (calculated as their triglycerides) in the alkyd resin. Long oil lengths (55% or higher) result in improved oxidative drying, good substrate adhesion, excellent flow properties, good solubility in aliphatic solvents, and low viscosity, even with low solvent content. However, these alkyds show strong yellowing. Medium oil length alkyds (40-55%) also have good solubility but show a higher viscosity. Paint films made of medium oil length alkyds have better mechanical properties such as hardness and durability. Short oil length alkyds (less than 40%) require additional measures, such as the use of additional siccatives or amino resins, to obtain acceptable drying times.

The olefinic unsaturation in the fatty acid building blocks allows copolymerization of vinyl monomers or polymers, such as styrene, acrylates or methacrylates. The use of styrenated or acrylated alkyds in paints, as for instance disclosed in EP-A 0 383 273, JP-A 62054767, and U.S. Pat. No. 4,927,877, has the advantage of reduced drying times and improved water and chemical resistance compared to plain alkyds. Further, acrylated alkyds have high elasticity, good pigment absorption, very good adhesion, less yellowing, and better gloss retention. Due to the addition of acrylate groups, the molecular weight of such binders is generally high, requiring a high solvent content to obtain a workable viscosity. However, the use of high solvent contents is undesirable in view of negative health effects and hazardous environmental impact. Further, the addition of acrylic or styrene groups lowers the content of fatty acid building blocks and thus the capability for oxidative drying. Therefore, and since a higher fatty acid content generally gives better flow and better solubility in organic solvents, alkyds having a high content of fatty acid building blocks are used. However, this results in long drying times and reduced mechanical properties of the paint film such as hardness and durability.

The article "*Alkyd Resins Using IPA Improve High-Solids Coatings*" by Clive Coady, *Modern Paint and Coatings*, February 1992, discusses a formulation of an acrylic modified alkyd in a so-called high-solids formulation. However, the volatile organic content still is considerably higher than 300 g/l, which is the legal upper limit in European jurisdictions for architectural paints such as interior and exterior trim and cladding paints for wood and metal substrates.

The article "*Acrylate Grafted Dehydrated Castor Oil Alkyd—A Binder for exterior Paints*" by Subhasri Majumdar c.s., *Journal of Coatings Technology*, Vol. 70, No. 879, April 1998, discusses paints comprising an alkyd binder acrylated with methyl methacrylate or butyl methacrylate monomers. Again the solvent content in the disclosed compositions is high, due to the low oil length.

It is the object of the invention to provide a coating composition with good flow properties and workable viscosity at low solvent contents on the one hand and short drying times with good hardness and durability on the other.

The object of the invention is achieved with a solvent-borne coating composition comprising at least one alkyd having at least 20% by weight of vinylic building blocks and an oil length below 65%. Surprisingly, it has been found that using such alkyds as a paint binder makes possible paint formulations with a low solvents content and yet having short drying times and good durability and hardness. Further, there was much less yellowing than with alkyds of the same oil length.

The oil length should be below 65%, for instance below 60% or between 45 and 58%. Generally, a lower molecular weight results in improved viscosity and reduced need of solvent. Good results were obtained using an acrylated alkyd of a molecular weight Mw below 18,000, e.g, below 15,000 or even below 12,000 or 10,000 or even lower if so desired.

Good results were obtained with a weight ratio non-vinylic:vinylic groups between 1:1 and 4:1., e.g., between 1.5:1 and 3:1. Preferably, the vinyl groups include styrene groups as well as (meth)acrylate groups. The weight ratio of styrene:acrylate groups can for example be between 0.5:1 and 4:1, for instance between 1.5:1 and 3:1.

Compatibility between the acrylate groups and the fatty acid building blocks can be improved by using low polarity acrylates, which can be identified by the solubility parameter of their homopolymer. Solubility parameters are discussed by Burrell on pages IV-337 and further, in the Polymer Handbook of Brandrup en Immergut (2nd Ed. 1975). Suitable examples of such low polarity monomers are monomers with a solubility parameter delta of 18 $(J/m^3)^{1/2}*10^{-3}$ or lower, for instance isopropyl (meth)acrylate, n-butyl (meth)acrylate, isobutyl (meth)acrylate, tert-butyl (meth)acrylate, cyclohexyl (meth)acrylate, 2-ethylhexyl (meth)acrylate, isobornyl (meth)acrylate, lauryl (meth)acrylate, and stearyl (meth)acrylate. Other suitable acrylate monomers are (meth)acrylic acid, methyl (meth)acrylate, ethyl (meth)acrylate, hydroxyethyl (meth)acrylate, hydroxypropyl (meth)acrylate, hydroxybutyl acrylate, glycidyl methacrylate, and acrylamide.

The used styrene building blocks can be plain styrene or substituted styrene. Optionally, one or more carbon atoms may be present on the ethylenically unsaturated group or on the aromatic group, e.g., vinyl toluene.

The acrylated alkyd according to the present invention can for instance be made by first preparing an alkyd and subsequently grafting vinylic groups to the alkyd.

The alkyd can be made by esterification of one or more polyols, one or more polycarboxylic acids and one or more fatty acids. At least part of the alkyd resins in the coating composition according to the invention is oxidatively drying as a result of the incorporation of unsaturated, aliphatic compounds, such as unsaturated fatty acids. Suitable examples of unsaturated fatty acids are myristoleic acid, palmitoleic acid, oleic acid, gadoleic acid, erucic acid, ricinoleic acid, oleic acid, linoleic fatty acid, linolenic fatty acid, tall oil fatty acid, sunflower fatty acid, safflower fatty acid, soybean oil fatty acid, and the like. Examples of fatty acids containing conjugated double bonds are dehydrated castor oil fatty acid and wood oil fatty acid. Other monocarboxylic acids suitable for use include tetrahydrobenzoic acid and hydrogenated or non-hydrogenated abietic acid or its isomer. If so desired, the monocarboxylic acids in question may be used wholly or in part as triglyceride, e.g., as vegetable oil, in the preparation of the alkyd resin. If so desired, mixtures of two or more of such monocarboxylic acids or triglycerides may be employed, optionally in the presence of one or more saturated, (cyclo)

aliphatic or aromatic monocarboxylic acids, e.g., pivalic acid, 2-ethylhexanoic acid, lauric acid, palmitc acid, stearic acid, 4-tert.butyl-benzoic acid, cyclopentane carboxylic acid, naphthenic acid, cyclohexane carboxylic acid, 2,4-dimethyl benzoic acid, 2-methyl benzoic acid, and benzoic acid.

Polycarboxylic acids are also incorporated into the alkyd resin, such as phthalic acid, isophthalic acid, terephthalic acid, 5-tert.butyl isophthalic acid, trimellitic acid, pyromellitic acid, succinic acid, adipic acid, 2,2,4-trimethyl adipic acid, azelaic acid, sebacic acid, dimerized fatty acids, cyclopentane-1,2-dicarboxylic acid, cyclohexane-1,2-dicarboxylic acid, 4-methylcyclohexane-1,2-dicarboxylic acid, tetrahydrophthalic acid, endo-methylene-cyclohexane-1,2-dicarboxylic acid, butane-1,2,3,4-tetracarboxylic acid, endoisopropylidene-cyclohexane-1,2-dicarboxylic acid, cyclohexane-1,2,4,5-tetracarboxylic acid, and butane-1,2,3,4-tetracarboxylic acid. If so desired, the carboxylic acids in question may be used as anhydrides or in the form of an ester, e.g., an ester of an alcohol having 1-4 carbon atoms.

The alkyd further comprises polyol building blocks. Examples of suitable diols are ethylene glycol, 1,3-propane diol, 1,6-hexane diol, 1,12-dodecane diol, 3-methyl-1,5-pentane diol, 2,2,4-trimethyl-1,6-hexane diol, 2,2-dimethyl-1,3-propane diol, and 2-methyl-2-cyclohexyl-1,3-propane diol. Examples of suitable triols are glycerol, trimethylol ethane, and trimethylol propane. Suitable polyols having more than 3 hydroxyl groups are pentaerythritol, sorbitol, and etherification products of the compounds in question, such as ditrimethylol propane and di-, tri-, and tetrapentaerythritol.

The alkyd resins can be obtained by direct esterification of the constituent components, with the option of a portion of these components having been converted already into ester diols or polyester diols. Alternatively, the unsaturated fatty acids can be added in the form of a drying oil, such as linseed oil, fish oil, or dehydrated castor oil. Transesterification with the other added acids and polyols will then give the final alkyd resin. This transesterification generally takes place at a temperature in the range of 200 to 250° C., optionally with solvents such as toluene and/or xylene also present. The reaction generally is carried out in the presence of a catalytic amount of a transesterification catalyst. Examples of transesterification catalysts suitable for use include acids such as p-toluene sulphonic acid, a basic compound such as a hydroxide, or compounds such as zinc acetate, tetraisopropyl orthotitanate, or dibutyl tin oxide.

The vinyl groups can be grafted to the alkyd, e.g., by adding a free radical and the vinyl monomers to a solution of the alkyd in organic solvent. The alkyd solution is heated to a temperature in the range of 80-180° C., usually about 140° C. to initiate the radical polymerization. Suitable examples of initiators for radical polymerization are peroxides or azo initiators.

To support the oxidatively drying mechanism, siccatives or driers can be used.

Examples of suitable siccatives are metal salts of aliphatic acids, including cycloaliphatic acids, or aromatic acids, such as ethylhexanoic acid, octanoic acid, and naphthenic acid, where the metal is, for example, cobalt, manganese, lead, vanadium, iron, zirconium, calcium, copper, potassium, lithium, zinc, aluminium, magnesium, bismuth, or a rare earth metal. Alternatively, the siccative may be selected from metal oxide acetylacetonates, metal acetylacetonates, metal chlorides, metal sulphates, and metal alcoholates, where the metal is, for example, selected from the above-mentioned metals. Typically, mixtures of siccatives are used. The siccatives (calculated as metal) are usually applied in an amount of 0,001 to 3 wt-%, calculated on the total binder solids content.

Besides these siccatives, the coating composition may optionally comprise drying-accelerating complexing agents, for example, 2,2'-bipyridyl and 1,10-phenantroline. The complexing agents can be added in an amount of 0-3 wt-%, e.g., 0.1-1.5 wt-%, based on the weight of the total binder.

The composition is particularly suitable for formulation as a solvent borne coating composition with a volatile organic content (VOC) below 300 g/11, a so-called high solids composition (solids content more than about 60%). However, it is also suitable for conventional coating compositions with a higher solvent content. In this context, VOC is determined in accordance with US standard ASTM D 2369 (one hour at 110° C.). Suitable solvents are for instance aromatic solvents such as toluene or xylene, as well as aliphatic solvents such as ethyl diglycol, ethyl glycol acetate, butyl glycol, butyl glycol acetate, butyl diglycol, butyl diglycol acetate, and methoxypropylene glycol acetate. Commercially available solvents are for instance Shellsol® D40, an aliphatic hydrocarbon solvent available from Shell, Dowanol® PMA from Dow and Solvesso®-150, available from ExxonMobil.

The composition according to the invention can be used as a clear varnish or may contain pigments. Pigments can ordinarily include opacifying pigments, such as titanium dioxide, zinc oxide, leaded zinc oxide, titanium calcium, or tinting pigments, such as carbon black, yellow oxides, brown oxides, tan oxides, raw and burnt sienna or umber, chromium oxide green, phthalocyanine green, phtalonitrile blue, ultramarine blue, cadmium pigments or chromium pigments. Fillers can also be added, such as clay, silica, talc, mica, woolastonite, wood flower, and the like.

The coating composition can furthermore contain one or more additives such as UV stabilizers, cosolvents, dispersants, surfactants, inhibitors, fillers, anti-static agents, flame-retardant agents, lubricants, anti-foaming agents, extenders, plasticizers, anti-freezing agents, waxes, thickeners, thixotropic agents, etc. Furthermore, the coating composition according to the invention may optionally comprise various antioxidants and anti-skinning agents.

The invention is further illustrated by the following examples. In the examples, contents are given in parts by weight. The following commercial products were used:

| | |
|---|---|
| Dowanol® PMA | is a methoxypropyleneglycol acetate solvent supplied by Dow; |
| Exkin® 2 | anti-skinning agent (MEKoxim) available from Sasol Servo Delden BV, Delden, the Netherlands; |
| Kronos® 2310 | titanium dioxide, a white pigment available from Kronos; |
| Nuodex® Combi APB | is a siccative composition comprising 7.5% metal drier (cobalt, zirconium and calcium) commercially available from Sasol Servo Delden BV, The Netherlands; |
| Nouracid® HE30 | is a sunflower fatty acid available from Akzo Nobel Chemicals; |
| Nouracid® DE554 | is a dehydrated castor oil fatty acid available from Akzo Nobel Chemicals; |
| Perkadox® AMBN | is an azo initiator supplied by Akzo Nobel Chemicals; |
| Shellsol® D40 | is an aliphatic hydrocarbon solvent supplied by Shell; |
| Trigonox® B | is ditertiary butylperoxide supplied by Akzo Nobel Chemicals. |

The following measuring methods were used:
The conversion of monomers was determined by gas chromatography using a calibration curve;
The solids content of the resins was determined in a ventilated oven at 125° C. for 60 minutes;

The VOC (volatile organic content) was determined according to ASTM D2369 (1 hour at 110° C.);

The viscosity was determined on a Brookfield® CAP2000 cone and plate viscometer at 23° C.;

The molecular weight Mw and Mn was determined by gel permeation chromatography (GPC) performed on a mixed-bed column with THF+0.5% acetic acid eluent at 1 ml/min using a polystyrene calibration curve;

Acid values were determined by potentiometric titration;

Yellowing was determined as follows. A 30 micrometer dry film was applied on a Leneta opacity chart. After 1 week drying of the paint the L, a, b values of the paint (according to CIE lab, ASTM-E313) were determined with a MacbethColorEye® 7000A on the white part of the Leneta chart. Subsequently, these panels were placed in a dark 50° C. oven for 600 hours and the L, a, b values were measured again. The difference in b value between the 1 week old samples and the 1 week +600 hours at 50° C. old samples is called the delta b value.

The drying time was measured as follows. The coating composition was applied on a glass plate with a draw bar at a dry layer thickness of 30 micrometer. Curing took place at 10° C. and 80% humidity in a climatized room under TL-055 light. Drying was tested by means of a BK drying recorder. Drying was judged as OK when phase 2 (the "dust free" phase, when the pin traces a scratchy line) was reached within 10 hours.

For durability measurements the paints were applied on a Q-panel (30 micrometer dry film thickness). After drying for 1 day at room temperature these panels were placed in a 35° C. oven for 100 hours. Then the initial 20° gloss was measured with a Byk gloss apparatus. Finally these samples were exposed in an Atlas weatherometer (WOM) according to ISO 11341. The durability was expressed as the half-life time of the initial 20° gloss.

Preparation of an Alkyd A-C

Three alkyds A-C were prepared. Raw materials as mentioned in Table 1 were combined in a reactor fitted with a mechanical stirrer, a thermocouple, nitrogen inlet, and a reflux condensor with a Dean-Stark trap. The mixture was heated to 240° C. and water resulting from the esterification reaction was removed azeotropically using xylene reflux until the measured acid value fell below 10 mg KOH/g. After cooling down to 180° C. the xylene was removed by distillation under reduced pressure. After further cooling resins were obtained having the properties shown in Table 1:

TABLE 1

|  | Example | | |
| --- | --- | --- | --- |
|  | A | B | C |
| Trimethylolpropane (parts) | 210 | 463 |  |
| Pentaerythritol (parts) | 101 | 216.5 | 263.5 |
| Phthalic anhydride (parts) | 225.5 | 493 | 157 |
| Nouracid ® HE30 (parts) | 1,063.5 | 1,614.5 | 1,313.5 |
| Nouracid ® DE554 (parts) |  | 713 |  |
| Solids content (%) | 99.4 | 99.2 | 99.0 |
| Acid value (mg KOH/g) | 7.5 | 8.3 | 8.9 |
| Viscosity (Pa · s) | 1.26 | 1.57 | 0.54 |

Acrylation of Alkyds A-C

EXAMPLE 1

Alkyd A (667 parts) was placed in a glass reactor fitted with a mechanical stirrer, a thermocouple, nitrogen inlet, and a reflux condensor. The reactor contents were inertized by applying a vacuum and breaking this by nitrogen, and heated to 135° C. A mixture of styrene (226 parts) and isobutyl methacrylate (108 parts) was added dropwise during 1 hour. At the same time a mixture of Trigonox® B (13.3 parts) and Shellsol® D40 (111 parts) was added dropwise during 1 hour. After that the reaction was continued for 5 hours. Two sequential post additions of Perkadox® AMBN (3.3 parts each) in a mixture of Shellsol® D40 (22 parts) and Dowanol® PMA (20 parts) were made with post reaction of 1 hour each to give a final conversion of 97.6%. Finally solvents were removed by vacuum distillation at 135° C. and the resin was diluted to about 80% using Shellsol® D40. The resin obtained showed a solids content of 78.8%, an acid value of 4.9 mg KOH/g, an oil length of 49.2% and a viscosity of 4.8 Pa.s. GPC data: Mn/Mw=3,429/11,404 g/mol.

EXAMPLE 2

The procedure and equipment of Example 1 were used to prepare an acrylated alkyd based on alkyd B. The same amounts of materials were used, except that now three post-additions of Perkadox® AMBN were made to obtain a final conversion of 98.0%. The resin obtained showed a solids content of 79.1%, an acid value of 4.4 mg KOH/g, an oil length of 49.2% and a viscosity of 7.2 Pa.s. GPC data: Mn/Mw=3,676/18,100 g/mol.

EXAMPLE 3

Example 1 was repeated using 600 parts of Alkyd A, 135 parts of styrene, 64 parts of isobutyl methacrylate, 8 parts of Trigonox® B in 72 parts Shellsol® D40, and two sequential post additions of 2 parts Perkadox® AMBN in 9 parts Shellsol® D40 and 9 parts Dowanol® PMA each. A final conversion of 96.1% was obtained. The resin obtained showed a solids content of 79.0%, an acid value of 7.1 mg KOH/g, an oil length of 49.2% and a viscosity of 1.3 Pa.s. GPC data: Mn/Mw=2,336/6,707 g/mol.

EXAMPLE 4

Example 1 was repeated using 480 parts of Alkyd A, 162 parts of vinyl toluene, 78 parts of isobutyl methacrylate, 9.6 parts of Trigonox® B in 38 parts Dowanol® PMA, and two sequential post additions of 2.4 parts Perkadox® AMBN in 22 parts Dowanol® PMA each. A final conversion of 96.0% was obtained. The resin obtained showed a solids content of 84.4%, an acid value of 5.1 mg KOH/g, an oil length of 49.2% and a viscosity of 8.9 Pa.s.

EXAMPLES 5-8

Using Alkyd C several acrylated alkyds were prepared with monomer compositions as shown in Table 2. In the procedure of Example 1 Alkyd C (300 parts) was used, as well as 6 parts Trigonox® B in 54 parts Shellsol® D40 and two sequential post additions of 1.5 parts Perkadox® AMBN in 7 parts Shellsol® D40 and 6.5 parts Dowanol® PMA each. Table 2 below shows the properties of the resins obtained.

TABLE 2

|  | Example | | | |
| --- | --- | --- | --- | --- |
|  | 5 | 6 | 7 | 8 |
| Styrene (parts) | 101 |  | 51 | 100 |
| Isobutyl methacrylate (parts) | 49 | 100 | 48 |  |
| Tertiary butylacrylate (parts) |  | 50 | 51 |  |
| Butylmethacrylate (parts) |  |  |  | 45 |
| Butylacrylate (parts) |  |  |  | 5 |
| Properties: |  |  |  |  |
| Conversion (%) | 98.3 | 98.3 | 96.2 | 96.3 |
| Solids content (%) | 83.4 | 78.7 | 78.4 | 84.1 |
| Acid value (mg KOH/g) | 6.0 | 5.8 | 5.7 | 6.9 |
| Viscosity (Pa·s) | 5.8 | 1.0 | 1.2 | 4.2 |
| Oil length (%) | 56 | 56 | 56 | 56 |
| GPC: Mn (g/mol) | 2,937 | 2,688 | 2,665 | 2,910 |
| GPC: Mw (g/mol) | 9,466 | 6,348 | 7,732 | 9,479 |

COMPARATIVE EXAMPLE 1

A high solids alkyd was used which was made of sunflower fatty acid, with an oil content of 74% and a solids content of 90 wt-% in Shellsol® D40, with a viscosity of 6.3 Pa.s at 23° C.

Paint Composition

The above mentioned alkyd resins were used in a paint composition comprising 422 wt parts solid alkyd binder, 333 wt parts Kronos® 2310 (titanium dioxide), 9.4 wt parts pigment dispersing agent, 31.5 wt parts Nuodex® Combi APB drier, and 2.2 wt parts Exkin® 2 (MEKoxim). The paint was diluted with Shellsol® D40 to an application viscosity of 0.5 Pa.s. The paint properties of the various paints are shown in Table 3.

TABLE 3

|  | VOC (g/l) | Drying (<10 hours) | WOM Durability (hours) | Yellowing (delta b) |
| --- | --- | --- | --- | --- |
| Comp. example 1 | 275 | OK | 730 | 3.60 |
| Example 1 | 320 | OK | 1,390 | 2.90 |
| Example 2 | 350 | OK | 1,200 | 2.50 |
| Example 3 | 270 | OK | 1,300 | 2.90 |
| Example 4 | 330 | OK | 1,000 | 3.20 |
| Example 5 | 285 | OK | 1,350 | 3.20 |
| Example 6 | 260 | OK | 2,200 | 2.80 |
| Example 7 | 265 | OK | 1,900 | 3.00 |
| Example 8 | 285 | OK | 1,350 | 3.50 |

The invention claimed is:

1. A solvent borne coating composition, having a volatile organic content of less than 300 g/l, and comprising an alkyd having vinylic building blocks, wherein the alkyd has an oil length of 45-65%, the alkyd has a weight average molecular weight, Mw, of less than 12,000, and a non-vinylic: vinylic group weight ratio between 1:1 and 4:1, said alkyd being further characterized in that the vinylic groups include styrene and (meth)acrylate groups, said styrene groups being styrene and/or substituted styrene, and wherein the ratio of styrene: (meth)acrylate groups is between 0.5:1 and 4:1, wherein the (meth)acrylate groups show low polarity, as identified by a solubility parameter, $\delta$, of no more than 18 $(J/m^3)^{1/2}*10^{-3}$.

2. The coating composition according to claim 1, wherein the non-vinylic: vinylic group weight ratio is between 1.5:1 and 3:1.

3. The coating composition according to claim 1, wherein the ratio of styrene: (meth)acrylate groups is between 1.5:1 and 3:1.

4. The coating composition according to claim 1, wherein the Mw of the alkyd is below 10,000.

5. The coating composition according to claim 1, wherein the oil length is in a range of 45% to 60%.

* * * * *